(12) United States Patent
Markusch

(10) Patent No.: US 6,503,288 B1
(45) Date of Patent: *Jan. 7, 2003

(54) PROCESS FOR THE PRODUCTION OF BIODEGRADABLE ENCAPSULATED FERTILIZERS

(75) Inventor: Peter H. Markusch, McMurray, PA (US)

(73) Assignee: Bayer Corporation, Pittsburgh, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,427

(22) Filed: Dec. 30, 1996

(51) Int. Cl.$^7$ ................................................ C05G 5/00
(52) U.S. Cl. ..................................... 71/64.07; 71/64.11
(58) Field of Search ............................ 71/64.07, 64.11

(56) References Cited

U.S. PATENT DOCUMENTS

| | | | |
|---|---|---|---|
| 3,259,482 A | 7/1966 | Hansen | 71/64 |
| 3,264,088 A | 8/1966 | Hansen | 71/64 |
| 3,264,089 A | 8/1966 | Hansen | 71/64 |
| 3,342,577 A | 9/1967 | Blouin et al. | 71/3 |
| 3,475,154 A | 10/1969 | Kato | 71/64 |
| 4,369,055 A | 1/1983 | Fujita et al. | 71/64.11 |
| 4,711,659 A | 12/1987 | Moore | 71/93 |
| 4,772,490 A | 9/1988 | Kögler et al. | 427/212 |
| 4,804,403 A | 2/1989 | Moore | 71/28 |
| 4,969,947 A | 11/1990 | Moore | 71/28 |
| 5,176,734 A | 1/1993 | Fujita et al. | 71/11 |
| 5,206,341 A | 4/1993 | Ibay et al. | 528/361 |
| 5,219,465 A * | 6/1993 | Goertz et al. | 71/64.07 |
| 5,374,292 A * | 12/1994 | Detrick et al. | 71/64.07 |
| 5,399,186 A * | 3/1995 | Derrah et al. | 71/64.07 |
| 5,538,531 A | 7/1996 | Hudson et al. | 71/28 |
| 5,547,486 A | 8/1996 | Dertrick et al. | 71/28 |
| 5,645,624 A | 7/1997 | Naka et al. | 71/64.07 |

FOREIGN PATENT DOCUMENTS

| | | | |
|---|---|---|---|
| CA | 2135788 | 1/1995 | |
| DE | 4127459 | * 2/1993 | 71/64.07 |
| DE | 4235135 | 4/1994 | |
| DE | 19615348 | 10/1997 | |
| JP | 38361 | * 3/1977 | 71/64.07 |
| JP | 52-38361 | 3/1977 | |
| JP | 3-146492 | 6/1991 | |
| JP | 5-97561 | 4/1993 | |
| WO | 93/06941 | 4/1993 | |
| WO | 96/01863 | 1/1996 | |

OTHER PUBLICATIONS

Database WPI, AN 92–409875, XP002062076 & JP 04 305 085 A (Yukishitsu Hiryo Seibutsu Kassei Riyou) Oct. 28, 1992.

* cited by examiner

*Primary Examiner*—Wayne Langel
(74) *Attorney, Agent, or Firm*—Joseph C. Gil; N. Denise Brown

(57) ABSTRACT

This invention relates to a process for the preparation of polyurethane encapsulated fertilizer particles. This process comprises applying an isocyanate-reactive component to fertilizer particles, and applying an aliphatic polyisocyanate to fertilizer particles in separate steps to form polyurethane encapsulated fertilizer particles. The two reactants may be applied in either order, with the polyisocyanate being first or last. These two steps may optionally be repeated as many times, as necessary to yield polyurethane encapsulated fertilizer particles which contain from 0.5 to 15% by weight of polyurethane, based on the total weight of the encapsulated fertilizer particles. It is also possible to mix the isocyanate-reactive component and the polyisocyanate together to form a mixture which is then applied to the fertilizer particles. These polyurethane coatings which encapsulates the fertilizer particles are biodegradable.

6 Claims, No Drawings

PROCESS FOR THE PRODUCTION OF BIODEGRADABLE ENCAPSULATED FERTILIZERS

BACKGROUND OF THE INVENTION

This invention relates to a process for producing encapsulated fertilizers which are biodegradable. This process comprises applying at least one coat of an isocyanate-reactive component comprising at least one polyester polyol or at least one polyether polyol to fertilizer particles, and applying at least one coat of an organic polyisocyanate to fertilizer particles, thus forming polyurethane encapsulated fertilizer particles. The present invention also relates to the encapsulated fertilizers produced by this process.

Commercial particulate fertilizers are produced and marketed in several different particle types, i.e., granular, pelletized, dusts, pilled, and prilled fertilizers. Also, they may be formed of inorganic substances, organic substances, or combinations thereof. The improvements of the present invention can be applied to any of these types of particulate fertilizers.

In order to be effective in promoting plant growth, fertilizers must contain some amount of water soluble plant nutrients. These are typically in the form of water soluble compounds of nitrogen, phosphorus and potassium, alone or in combination, and often in conjunction with other elements such as, for example, calcium, boron, magnesium, zinc, chlorine, etc. Such particular fertilizers can be made of a single component, e.g., urea, ammonium nitrate, potassium chloride, etc., or of multiple components often mixed with inert water soluble or water insoluble materials as in common fertilizers designated as 6-6-6, 4-6-4, 10-10-10, 20-20-5, 14-16-0, 5-20-20, and the like. In addition, specialized fertilizers may contain optional additives such as herbicides, insecticides, trace elements, iron salts, sulfur, etc. The improvements of the present invention can be applied to any of these fertilizers.

Historically, particulate fertilizers possessed a number of known defects, the most notable being the too rapid release of soluble plant food, causing phytotoxicity and the rapid depletion of the plant nutrients by leaching. Other problems included tendencies to cake and form dust. These problems are well documented in previous patents that professed solutions to one or more of the known defects, including U.S. Pat. Nos. 3,475,154, 3,259,482, 3,264,088, 3,264,089, 4,711,659, 4,772,490 and Japanese Patent 52-38361. The present invention provides additional improvements in the construction of particulate fertilizers which render them highly attrition resistant, biodegradable, and further extended release properties.

A number of slow release coatings for particular fertilizers have previously been proposed. The process of sulfur coating urea particles is described in U.S. Pat. No. 3,342,577 and was developed in the late 1960's by the Tennessee Valley Authority (TVA) as an economical system for reducing the rate of dissolution when urea particles are applied to the soil as fertilizer. This process requires high levels of sulfur, which reduces the nutrient analysis of the fertilizer particles, and even then, imperfections remain in the coating making it necessary to apply a sealant coating, which is composed of a mixture of 30% polyethylene resin in a 70% bright stock mineral oil.

Coatings in which preformed polymer resins are applied from solvents have been described in, for example, U.S. Pat. Nos. 3,475,154 and 3,264,089. The use of solvents creates a vapor hazard as the products are dried and the solvent evaporation step can result in pinhole imperfections in the coatings when applied.

U.S. Pat. No. 4,369,055 tried to facilitate degradation of coating materials while maintaining the function for controlling the dissolving-out rate by dispersing inorganic powders such as sulfur and talc in a low molecular weight olefin polymer. However, the disclosed coating materials are not completely degraded and thus remain intact in the soil.

Polyurethane coatings as disclosed in U.S. Pat. No. 4,711, 659 and 4,969,947 require that the substrate contains a minimum quantity of reactive —$NH_2$ groups. Thus, these are not applicable to all fertilizer compositions for which slow release properties may be desirable.

Coating of fertilizer compositions with a biodegradable polymer was described in U.S. Pat. No. 5,176,734 and 5,206,341 and Japanese Patent Application No. 146492/1991. These references disclose coating the fertilizer composition with a biodegradable coating material in a single layer. The single layer coating has difficulties controlling the dissolving out rate of fertilizer nutrients while maintaining biodegradability simultaneously.

Japanese Patent Application No. 97561/1993 discloses a three layer coating which was prepared by using one type of biodegradable film and a water soluble resin. This coating also has difficulty in controlling both the dissolving-out rate and the biodegradability at the same time. The thickness of the coating material is disclosed as being from 500 to 2,000 $\mu$m. Such a coating material requires increased cost, thus making it unsuitable for commercial use.

Canadian Patent Application No. 2,135,788 relates to coating fertilizer compositions with at least two types of coating materials wherein the two coating materials have different dissolving-out rates and moisture permeability in a multi-layer structure.

U.S. Pat. No. 5,538,531 also describes controlled release fertilizers and a method for their production. These controlled release fertilizers have a central mass of particulate fertilizer which contains at least one water soluble plant nutrient surrounded by a plurality of coatings. The inner coating comprises the reaction product of (A) an aromatic polyisocyanate or derivatives thereof which contain about 1.5 to 3 NCO groups per molecule and an NCO group content of 10 to 50% by weight, and (B) a polyol having from 2 to 6 hydroxyl moieties and at least one alkyl moiety containing from about 10 to 22 carbon atoms. An outer coating is also necessary. The outer coating consists essentially of an organic wax having a drop melting point of between 50 and 120° C. These encapsulated fertilizers are not, however, biodegradable.

As used herein, the term biodegradable means a nearly quantitative biological degradation and conversion process (i.e., composting) of the coatings produced according to the present invention. Biodegradation is brought about mainly by bacteria such as, for example, actinomycetes and fungi such as, for example, members of the genera Aspergillus, Penicillium and Mucor and yeast. This requires an aerobic medium with sufficient moisture. Thus, the synthetic coating composition to be composted according to the present invention must satisfy several fundamental requirements. It must be completely mineralized without leaving a residue and converted into $CO_2$ and water or into a biomass (i.e., a living cell). Both the material (i.e., coating composition) and all metabolites and degradation products must be toxicologically and ecotoxicologically harmless.

Advantages of the present invention include the fact that this process provides a more uniform coating on the fertilizer particles with good time release properties while the fertilizer is being absorbed into the soil. Additionally, the coating degrades, leaving no harmful residue in the soil.

SUMMARY OF THE INVENTION

This invention relates to a process for the production of biodegradable polyurethane encapsulated fertilizer particles. This process comprises 1) applying a) an isocyanate-reactive component comprising one or more polyester polyols or one or more polyether polyols to fertilizer particles coated with an isocyanate-reactive component, wherein said polyester polyols and polyether polyols have functionalities of from 1.5 to 4, preferably from 2 to 3, and a molecular weight of from 500 to 5,000, preferably from 1,000 to 3,000; and 2) applying b) a (cyclo)aliphatic polyisocyanate to the fertilizer particles from step 1) to form polyurethane encapsulated fertilizer particles. These two steps are optionally repeated (successively) as many times as necessary to form the desired thickness of the polyurethane coating which encapsulates the fertilizer particles. The encapsulated fertilizer compositions which are produced by this process contain from about 0.5 to 15%, preferably 1 to 10%, most preferably 3 to 7% by weight of polyurethane, based on the total weight of the encapsulated fertilizer composition.

In another embodiment, this process comprises 1) applying b) an organic (cyclo)aliphatic polyisocyanate to fertilizer particles to form isocyanate coated fertilizer particles, followed by 2) applying a) one or more polyester polyols or one or more polyether polyols to the isocyanate coated fertilizer particles from step 1), thereby forming a polyurethane encapsulated fertilizer composition. Suitable polyester polyols and polyether polyols have functionalities of from 1.5 to 4, preferably 2 to 3, and molecular weights of from 500 to 5,000, preferably from 1,000 to 3,000. These two steps are optionally repeated (successively) as many times as necessary to form the desired thickness of polyurethane coating which encapsulates the fertilizer particles. The encapsulated fertilizer compositions which are produced contain from about 0.5 to 15%, preferably 1 to 10%, most preferably 3 to 7% by weight of polyurethane, based on the total weight of the encapsulated fertilizer composition.

In a less preferred embodiment, this process comprises 1) mixing a) and b) either continuously or in a batch process in quantities such that the ratio of isocyanate groups contained in component b) to isocyanate-reactive groups contained in component a) is from about 0.8:1 to about 2.0:1, preferably about 0.9:1 to about 1.2:1 and most preferably about 0.93:1 to about 1.1:1; followed by 2) applying the mixture to the fertilizer particles; and, optionally, 3) repeating step 2) as often as necessary to form the desired thickness of polyurethane coating encapsulating the fertilizer particles. This embodiment is less preferred due to the possibility of air entrapment during the mixing stage which can result in bubbles forming in the coating leading to a less continuous film on the encapsulated particle. Another problem is since the viscosity of the reacting mixture increases as the reaction proceeds after combining a) and b), the result is that the thickness of the coating applied on the fertilizer particles may increase correspondingly as the viscosity of the reacting mixture does. Thus, the particles coated using the last portion of the mixture would have a thicker coating than particles coated using the first portion of the mixture.

The present invention also relates to encapsulated fertilizer compositions produced by these processes.

DETAILED DESCRIPTION OF THE INVENTION

Suitable polyisocyanates for the present invention include aliphatic and/or cycloaliphatic diisocyanates or polyisocyanates derived therefrom. These are referred to herein as (cyclo)aliphatic polyisocyanates.

Suitable (cyclo)aliphatic polyisocyanates for the present invention have an NCO functionality of at least 2, and preferably a viscosity of less than about 20,000, preferably less than 10,000 mPa·s at 25° C. It is preferred that the polyisocyanate component of the present invention contains, besides a multiplicity of isocyanate groups, at least one functional group which is selected from the group consisting of:

b1) isocyanurate groups (trimer),
b2) biuret groups,
b3) uretdione groups (dimer),
b4) urethane groups,
b5) allophanate groups,
b6) a combination of isocyanurate and allophanate groups,
b7) carbodiimide groups and/or uretonimines,
b8) oxadiazinetrione groups,
b9) urea groups, and
b10) blends thereof.

Suitable polyisocyanate components and adducts for the present invention include, for example, aliphatic diisocyanates and cycloaliphatic diisocyanates, such as 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclo-hexylmethane diisocyanate, 1,3- and 1,4-bis-(isocyanatomethyl)-cyclo-hexane, bis-(4-isocyanato-3-methylcyclohexyl)-methane, α,α,α',α'-tetramethyl-1,3- and/or -1,4-xylylene diisocyanate (TMXDI), 1-isocyanato-1-methyl-4(3)-isocyanatomethyl cyclohexane, 2,4- and/or 6-hexahydro-toluylene diisocyanate, and mixtures thereof.

Polyisocyanate compounds wherein all the NCO groups are attached to tertiary carbon atoms are least preferred. These include compounds such as, for example, α,α,α',α'-tetramethyl-1,3- and/or -1,4-xylylene diisocyanate (TMXDI). It is less preferred to use polyisocyanate compounds wherein NCO groups are cycloaliphatically bound. Examples of such less preferred polyisocyanates are 1-isocyanato-3-isocyanatomethyl-3,5,5-trimethyl-cyclohexane (IPDI) and bis-(4-isocyanatocyclohexyl)-methane.

It is preferred that the polyisocyanate be an alicyclic (or linear) aliphatic diisocyanate. Of the aliphatic diisocyanates, it is preferred that the NCO groups are attached to primary carbon atoms. Of these diisocyanates, hexamethylene diisocyanate is most preferred.

Suitable polyisocyanate adducts containing biuret groups include polyisocyanates such as those described, for example, in U.S. Pat. Nos. 3,124,605, 3,358,010, 3,644,490, 3,862,973, 3,906,126, 3,903,127, 4,051,165, 4,147,714, and 4,220,749, the disclosures of which are herein incorporated by reference. As set forth in these patents, these biuret group-containing polyisocyanates may be prepared by using co-reactants such as water, tertiary alcohols, primary and secondary monoamines, and primary and/or secondary diamines. These polyisocyanates preferably have an NCO content of 18 to 22% by weight and an average NCO functionality at least about 2, preferably of 3 to 3.8.

Suitable polyisocyanates containing isocyanurate groups include compounds such as those described, for example, in U.S. Pat. Nos. 4,288,586 and 4,324,879, the disclosures of which are herein incorporated by reference; European Patents 3,765, 10,589 and 47,452, the disclosures of which are herein incorporated by reference; and German Offenlegungsschriften 2,616,416, herein incorporated by reference. The isocyanato-isocyanurates generally have an average NCO functionality of at least about 2, preferably of 3 to 3.8, and an NCO content of 5 to 30%, preferably 10 to 25% and most preferably 15 to 25% by weight.

Uretdione diisocyanates may be prepared by oligomerizing a portion of the isocyanate groups of a diisocyanate in the presence of a trialkyl phosphine catalyst, and may be used in admixture with other aliphatic and/or cycloaliphatic polyisocyanates, particularly the isocyanurate group-containing polyisocyanates described hereinabove.

Urethane group-containing polyisocyanates which may be prepared in accordance with the process disclosed in U.S. Pat. No. 3,183,112, herein incorporated by reference, by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof.

Allophanate group-containing polyisocyanates include, for example, those prepared according to the processes disclosed in U.S. Pat. Nos. 3,769,318, 4,160,080 and 4,177,342, the disclosures of which are herein incorporated by reference.

Isocyanurate and allophanate group-containing polyisocyanates include, for example, those which may be prepared in accordance with the processes set forth in U.S. Pat. Nos. 5,124,427, 5,208,334 and 5,235,018; the disclosures of which are herein incorporated by reference. These polyisocyanates containing isocyanurate and allophanate groups preferably have an NCO content of 16 to 22% by weight, most preferably of 18 to 21% by weight.

Suitable carbodiimide group-containing and uretone imine group-containing polyisocyanates for the present invention include, for example, those which may be prepared by oligomerizing di- or polyisocyanates in the presence of known carbodiimidization catalysts such as described in, for example, German Patentschrift 1,092,007, herein incorporated by reference, U.S. Pat. No. 3,152,162, herein incorporated by reference, and German Offenlegungschriften 2,504,400, 2,537,685 and 2,552,350, the disclosures of which are herein incorporated by reference.

It is also possible to use polyisocyanates containing oxadiazinetrione groups and containing the reaction product of two moles of a diisocyanate and one mole of carbon dioxide.

Preferred polyisocyanate adducts are the polyisocyanates containing isocyanurate groups b1), biuret groups b2), or polyisocyanates containing both isocyanurate and allophanate groups b6). Isocyanurate group-containing polyisocyanates suitable for the present invention generally have an average NCO functionality of at least about 2 and a viscosity of less than about 20,000 mPa·s at 25° C. The biuret group-containing polyisocyanates generally have an average NCO functionality of at least about 2 and a viscosity of less than about 20,000 mPa·s at 25° C. Polyisocyanates containing isocyanurate and allophanate groups generally have an average NCO functionality of at least about 2 and a viscosity of less than about 20,000 mPa·s at 25° C.

It is more preferred to use isocyanurate group-containing polyisocyanates as component b1) which are prepared, for example, by trimerizing a portion of the isocyanate groups of 1,6-hexamethylene diisocyanate; containing tris-(6-isocyanatohexyl)-isocyanurate and higher homologs thereof; and having an NCO content of about 20–23% by weight, a monomeric diisocyanate content of <2%, a viscosity at 25° C. of less than 10,000 mPa·s and an average isocyanate (i.e., NCO) functionality of about 3 to 3.5. Suitable compounds include isocyanurate group-containing polyisocyanates such as those described, for example, in U.S. Pat. Nos. 4,288,586 and 4,324,879, the disclosures of which are herein incorporated by reference. Low monomer content polyisocyanates such as these significantly decrease health concerns and risks associated with handling polyisocyanates.

The more preferred polyisocyanates to be used as component b2) include, for example, tris-(6-isocyanatohexyl)-biuret or mixtures thereof with its higher homologs. These biuret group-containing polyisocyanates generally have an NCO content of about 18 to 25% by weight and an average NCO functionality of at least about 2. Suitable biuret group-containing polyisocyanates include polyisocyanates such as those described, for example, in U.S. Pat. No. 3,903,127, herein incorporated by reference. As mentioned hereinabove, low monomer content polyisocyanates such as these significantly decrease health concerns and risks associated with handling polyisocyanates.

Another more preferred group of polyisocyanate adduct includes the polyisocyanates containing isocyanurate and allophanate groups that are based on 1,6-hexamethylene diisocyanate. Suitable such compounds generally have an NCO content of from 16 to 25% by weight, and a viscosity of less than about 3000 mPa·s at 25° C. Some examples of suitable isocyanates include, for example, those compounds described, for example, in U.S. Pat. Nos. 5,124,427, 5,208,334, and 5,235,018, the disclosures of which are herein incorporated by reference. These polyisocyanates also contain low quantities of monomeric isocyanates.

A most preferred isocyanurate group-containing polyisocyanate to be used as component bi) can be prepared from 1,6-hexamethylene diisocyanate and having an isocyanate content of about 21.6%, a content of monomeric diisocyanate of <0.2%, and a viscosity at 25° C. of about 3000 mPa·s.

A most preferred biuret group-containing polyisocyanate to be used as component b2) of the invention can be prepared from 1,6-hexamethylene diisocyanate and having an isocyanate content of about 23%, a content of monomeric diisocyanate of <0.7% and a viscosity at 25° C. of about 1300 to 2200.

A most preferred polyisocyanate containing isocyanurate and allophanate groups to be used as component b6) can be prepared from 1,6-hexamethylene diisocyanate and 1-butanol, and has an isocyanate content of about 18 to 21% by weight such as described, for example, in U.S. Pat. No. 5,124,427, herein incorporated by reference. This preferred polyisocyanate component has an isocyanate content of about 18 to 21% by weight, a viscosity at 25° C. of less than about 1500 mPa·s, and a monomeric diisocyanate content of <0.7%.

Suitable polyester polyols have functionalities of from 1.5 to 4, preferably from 2 to 3, and molecular weights of from 500 to 5,000, preferably from 1,000 to 3,000. Suitable polyester polyols may be prepared, for example, by polymerizing organic compounds containing both the alcohol and carboxylic acid functionalities. Examples of these compounds are the hydroxyacetic acids represented by the formula:

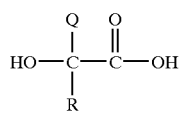

wherein:
Q and R can be the same or different, and each represents a linear or branched alkyl group (preferably a $C_1$ to $C_{18}$ alkyl group), a cycloaliphatic group, a substituted cycloaliphatic group or hydrogen.

Two particularly preferred polyester polyols which correspond to the above formula are lactic acid and hydroxyvaleric acid.

Suitable polyester polyols may also be prepared, for example, by reacting polyhydric, preferably a dihydric alcohol (optionally in the presence of trihydric alcohols), with polyvalent, preferably divalent carboxylic acids (optionally in the presence of trivalent carboxylic acids). These types of reactions are known, per se, in the field of polyurethane chemistry. The reaction may be by solvent-free condensation in the presence of catalysts such as, for example, titanium tetrabutylate. It is also possible that carboxylic acid chlorides, carboxylic acid anhydrides, or carboxylic acid esters of lower alcohols may be used instead of the corresponding free carboxylic acids in the preparation of these polyester polyols.

In one embodiment, the linked esterified alkoxylated polyol is obtainable by, for example, alkoxylation of a polyol having from 3 to 8 hydroxyl groups with from n to 10n equivalents of a $C_2$–$C_6$ aliphatic epoxide, wherein n is equal to the number of hydroxyl groups on the polyol, to form an alkoxylated polyol and (b) esterification of the alkoxylated polyol with both (i) at least one $C_6$–$C_{24}$ monocarboxylic acid entity and (ii) a polycarboxylic acid entity selected from dimer or trimer fatty acid entities and dicarboxylic acid entities having the general structure:

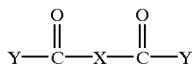

wherein X is an aliphatic moiety comprised of from 1 to 10 carbon atoms and up to 2 carbon-carbon double bonds and Y is hydroxy, halide, or alkoxy, wherein the amount of $C_6$–$C_{24}$ monocarboxylic acid entity is from 1 to n−1 moles per mole of polyol and the amount of polycarboxylic acid entity is from 1/z to n−1/z moles per mole of polyol, where z is equal to the number of carboxylate functionalities in the polycarboxylic acid entity.

Some examples of suitable polyhydric alcohols for preparing the polyester polyols include aliphatic or cycloaliphatic polyhydric, and preferably dihydric alcohols. These include compounds such as, for example, ethylene glycol, diethylene glycol, triethylene glycol, 1,2- and 1,3-propylene glycol, dipropylene glycol, 1,5-pentanediol, 1,4-butanediol, 1,6-hexanediol, neopentyl glycol, cyclohexane dimethanol, 2,2,4-trimethyl-1,5-pentanediol, 2-ethyl-1,6-hexanediol, etc. It is also possible that mixtures of these polyhydric alcohols may be used. It is preferred that dihydric alcohols are used which contain from 2 to 5 carbon atoms and which are preferably linear compounds.

The polyol (or polyhydric alcohol) may be selected from $C_3$–$C_{12}$ aliphatic triols (e.g., glycerol, 1'-2'-4-butane triol, 2,3,4-pentane triol, 2-ethyl-2-(hydroxymethyl)-1,3-propane triol (trimethylol propane), 1,1,1-tris(hydroxymethyl) ethane, 1,2,6trihydroxyhexane, 1,2,3-hep-tanetriol, and the like), $C_4$–$C_{12}$ aliphatic tetrols (e.g., erthyritol, sorbitan, pentaerythritol), $C_5$–$C_8$ sugar alcohols [including those compounds corresponding to the formula $HOCH_2(CHOH)_n$—$CH_2OH$ wherein n is 3 to 6 such as xylitol, sorbitol, arabitol, mannitol, and the like], monosaccharides (e.g., erythrose, threose, ribose, arabinose, xylose, lyxose, allose, altrose, glucose, mannose, gulose, idose, galactose, fructose, galactose, and the like), disaccharides (e.g., sucrose, lactose, maltose) and alkyl glycosides (e.g., methyl glycosides, ethyl glycosides, propyl glycosides, and other glycoside molecules wherein the alkyl glycoside is an acetal formed by interaction of a $C_1$–$C_{20}$ alcohol with a carbonyl group of a mono- or disaccharide such as glucose).

Some examples of suitable polyvalent carboxylic acids include those wherein the polycarboxylate linking segment corresponds to the general structure:

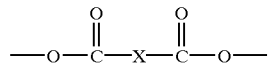

wherein X is an aliphatic moiety comprised of from 1 to 10 carbon atoms and up to 2 carbon-carbon double bonds, or a cycloaliphatic moiety comprised of the residue obtained by removing the carboxyl groups from the different isomers of hexahydrophthalic acids or their corresponding anhydrides. For example, X may be —($—CH_2$)$_m$ where m is an integer of from 1 to 10. Polycarboxylate linking segments of this type thus may be derived from dicarboxylic acids or their functional equivalents (halides, anhydrides, esters) such as, for example, malonic acid, succinic acid, glutaric acid, adipic acid, pimelic acid, suberic acid, azelaic acid, sebacic acid, undecanedioic acid, dodecanedioic acid, oxalic acid, and brassylic acid and mixtures or combinations thereof. Branched, substituted (including hydroxy-substituted), or unsaturated di- and tri-carboxylic acid entities may also be utilized, including, without limitation, carboxystearic acid, polycarboxystearic acid, tricarballylic acid, aconitic acid, maleic acid, tartaric acid, citric acid, maleic acid, citraconic acid, cyclohexane dicarboxylic acid, ethyl malonic acid, methyl succinic acid, 2,2-dimethyl succinic acid, methyl glutaric acid, fumaric acid, methyl adipic acid, 2-ethyl-2-methyl succinic acid, diethyl malonic acid, tartaric acid, thapsic acid, dimethyl glutaric acid, cyclohexane diacetic acid, $C_{21}$ dicarboxylic acid (obtainable, for example, by reacting linoleic acid with acrylic acid), and their halides, anhydrides, esters and the like and mixtures thereof. Cyclodextrins are also suitable for the present invention. Of these, adipic acid is preferred.

Less preferred are the polyvalent aromatic carboxylic acids, including the isomers of phthalic acid. When these are used, they are used preferably in admixture with the aliphatic carboxylic acids.

In another desirable embodiment, the polycarboxylate linking segment is derived from a dimer fatty acid, a trimer fatty acid, or a mixture of dimer and trimer fatty acids or their equivalents (halide, ester, anhydride). Such substances are well-known and are described, for example, in Leonard, "Dimer Acids", Kirk-Othmer Encyclopedia of Chemical Technology, 3rd Ed., Vol. 7, pp. 768–782 (1979), Leonard, The Dimer Acids, Humko Sheffield Chemical (1975), Johnson, "Dimerization and Polymerization", in E. H. Pryde, ed., Fatty Acids, American Oil Chemists' Society, pp. 343–352, (1979), and Pryde et al., "Aliphatic Dibasic Acids", in Condensation Monomers, Wiley-Interscience (1972). Especially preferred for use are the dimer and trimer fatty acids formed by the polymerization of $C_{18}$ unsaturated fatty acids such as oleic acid, linoleic acid, linolenic acid, elaidic acid and the like. The dimer fatty acid may have an acyclic, monocyclic, or bicyclic structure or comprise a mixture of compounds having different such structures. The use of a dimer or trimer fatty acid entity furnishes a polycarboxylate linking segment having the general structure:

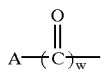

wherein w is 2 (as in a dimer acid) or 3 (as in a trimer acid) and A is the hydrocarbyl portion of a dimerized or trimerized fatty acid.

Also suitable are fatty acids and their equivalents which are readily available at a low cost from natural sources such as edible triglycerides. Specific illustrative fatty acids suitable for use include, but are not limited to eicosanoic (arachidic) acid, heneicosanoic acid, docosanoic (behenic) acid, elaidic acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. The fatty acids may be derived synthetically or from natural sources such as triglyceride lipids. Mixtures of fatty acid entities, such as the mixtures of fatty acids typically obtained by hydrolysis (splitting) of a triglyceride such as corn oil or soybean oil, may advantageously be used.

The properties and characteristics of the linked esterified alkoxylated polyol may be varied or controlled as desired by adjusting the relative proportions of $C_6$–$C_{24}$ monocarboxylic fatty acid-esterified oxyalkylene segments to polycarboxylate linking segments.

The triglyceride lipid admixed with the linked esterified propoxylated glycerin composition may be any of the known edible fatty acid triglycerides available from natural or synthetic sources. These edible fatty acid triglycerides include, but are not limited to, fats and oils such as tallow, soybean oil, linseed oil, castor oil, cottonseed oil, coconut oil, palm kernel oil, corn oil, fish oil, lard, butterfat, olive oil, palm oil peanut oil, safflower seed oil, cocoa butter, sesame seed oil, rapeseed oil, sunflower seed oil, as well as fully or partially hydrogenated derivatives and mixtures of these triglycerides. While the linked esterified alkoxylated polyol composition may be combined in any proportion with the triglyceride lipid, weight ratios of from 5:95 to 95:5 are particularly advantageous. The triglyceride lipid may be selected so as to impart a desirable thermal stability, viscosity, rheology (Newtonian or non-Newtonian) or other property to the blend.

Suitable polyether polyols for the present invention are those having functionalities of from 1.5 to 4, preferably 2 to 3, and molecular weights of from 500 to 5,000, preferably 1,000 to 3,000. These polyethers may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether). It is also preferred to use polyether copolymers which contain a substantial amount (i.e., greater than about 25% by weight) of ethylene oxide in the internal blocks of the polyether.

It is also possible that the isocyanate-reactive component which comprises one or more polyester polyols or one polyether polyols additionally comprises a low molecular weight organic compound. Suitable low molecular weight organic compounds include, for example, those compounds having a molecular weight of less than 500, and an average functionality of from 1.0 to 3.0, preferably 1.5 to 2.5, and most preferably 1.8 to 2.2. These compounds are carefully selected from the group consisting of monoalcohols, diols, triols, and mixtures thereof. Some examples of suitable compounds include, for example, glycols such as, for example, those described above as suitable polyhydric alcohols for the preparation of the polyester polyols. Preferred are ethylene glycol, diethylene glycol, and triethylene glycol as well as 1,4-butylene glycol.

It is also possible to include other additives in either the isocyanate-reactive component or the polyisocyanate component prior to applying the component to the fertilizer particles. Possible additives include, for example, catalysts, preferably ones that are not toxic and do not contain heavy metals, flow aids, surfactants, defoamers and other additives known to those skilled in the art. Any additive which aids the formation of the polyurethane coating which encapsulates the fertilizer particles may be included in one or both of these components. It is, however, preferred that no additives are included in either of the two components. One concern is that these additives may not be biodegradable. Thus, it is most preferred that heavy metal catalysts are not used in the process of the present invention.

Suitable fertilizer particles for the present encapsulation process include any of the known chemical fertilizers. Some examples are ammonium sulfate, ammonium nitrate, urea, guanidine, melamine, sodium nitrate, ammonia phosphate, potassium phosphate, and combinations thereof. These fertilizer particles are obviously water soluble. In the present application, it is not necessary, but however acceptable, for the fertilizer particles to contain some reactive functional groups such as, for example, $NH_2$ groups.

As used herein, the phrase "fertilizer particles" refers to any of the commercially available particulate fertilizers which are produced and marketed in various particle types. Some examples include granular, pelletized, dusts, pilled and prilled fertilizers.

An attrition resistant, controlled release particulate fertilizer may be prepared by applying the isocyanate-reactive component and the polyisocyanate to fertilizer particles which are heated to a temperature of between about 60 and 105° C. The fertilizer particles are kept in continuous low shear, low impact, motion relative to each other by mixing apparatus. Examples of suitable mixing apparatus include fluid bed, rotating drum, pan pelletizer, and any others which can provide a continuous, low shear motion of the fertilizer particles.

More specifically, attrition resistant, controlled release fertilizers may be produced by (i) providing a quantity of fertilizer particles and heating them to a temperature above the melting point of the isocyanate-reactive component, but no higher than about 120° C., (ii) agitating the fertilizer particles such that a gentle mixing thereof is maintained, (iii) adding to the agitated fertilizer particles an isocyanate-reactive component comprising one or more polyester polyols and/or one or more polyether polyols as described above, (iv) after the isocyanate-reactive component has spread uniformly, adding to the agitated fertilizer particles a polyisocyanate component, in an amount such that the ratio of NCO groups to hydroxyl groups is from about 2.0 to about 0.8, more preferably 1.2 to 0.9, an most preferably 1.1 to 0.93, (v) allowing the polyisocyanate and the isocyanate-reactive materials to react, thus forming a solidified polyurethane coating on the fertilizer particles, and (vi) cooling the coated fertilizer particles to about or slightly above room temperature, with continuous agitation.

Metering of the streams of the polyisocyanate component and the isocyanate-reactive component onto the fertilizer particles can be continuous. It is may be, however, advantageously discontinuous, when only a portion of the total amount of each of the two reactants is added and allowed to react prior to applying additional portions.

Successful application of the coatings of the present invention to particulate fertilizers depends on factors such as i) fairly precise temperature control, ii) continuous non-shear movement of fertilizer particles during application of the optionally successive urethane coatings, and iii) followed by cooling.

In practicing the process of the present invention, the polyol component containing I or more alkyl moieties is preferably applied to the central mass of fertilizer prior to the addition of the first isocyanate component. The low interfacial tension between the hydroxyl moieties and the polar fertilizer particle surface and the low viscosity of the alkyl containing polyol component in the liquid state allows this component to spread on and adhere to the particle surface producing a cohesive film; this polyol film is then reacted with the isocyanate component. Adhesion which depends on surface activity of the polyol component is superior to that resulting from the chemical reaction of the isocyanate component since (1) it is not necessary for the fertilizer particles to contain reactive groups for adhesion of the coating material, and (2) only a very minute portion of the reactive groups in the fertilizer particles containing them are actually exposed on the surface, and these reactive groups are in a solid phase and thus do not readily react with the liquid isocyanate component. When fertilizers containing reactive groups (e.g., urea groups) are used, it is often necessary to heat the fertilizer close to its melting point to allow these reactive groups to combine with the isocyanate component.

The following example further illustrates details for the process of this invention. The invention, which is set forth in the foregoing disclosure, is not to be limited either in spirit or scope by this example. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example

In this example, acetone and hexane were used as carrier solvents to more easily apply the coating to the fertilizer. It is preferred to apply the components neat, using no carrier solvent on an industrial scale.

Granules of Agway 5-10-10 fertilizer (100 g) were charged into a 1000 ml flask and the flask attached to a rotary evaporator. The flask was rotated above a 85° C. water bath and evacuated using an aspirator.

A polyol solution was formed by diluting 2.48 g of a 2000 molecular weight hydroxy functional ethylene-butylene adipate ester, 0.50 g. of 1,4-butanediol, and 0.022 g. of tin catalyst (UL-28) with 17 g. of acetone (the carrier solvent). This polyol solution was applied onto the fertilizer granules by using vacuum to pull the solution into the flask by means of the tubing/stopcock device.

In order to assure complete transfer of the polyol solution into the flask containing fertilizer granules, two additional acetone portions, (of 10 g. each) were added through the charging tube in order to flush it.

The rotating flask was slowly lowered into the 85° C. water bath and the vacuum was adjusted to about 60 Torr. The acetone was removed from the rotating flask by vacuum distillation which left the polyol mixture coated on the surface of the fertilizer granules. However, some of the polyol mixture was also on the wall of the flask.

An isocyanate solution was prepared using 1.19 g. of 1,6-hexamethylene diisocyanate (HDI) having an isocyanate content of 50% by weight, and 18 g. of hexane (the carrier solvent). This solution was applied onto the polyol coated fertilizer granules in the rotating flask in the same manner in which the polyol solution was deposited. To assure complete transfer of the isocyanate, two additional hexane flushes (of 10 g. each) were added through the charging tube. After removal of the hexane by vacuum distillation, the granules continued to be rotated in the 85° C. water bath for 1 hour. After 1 hour, polyurethane coated fertilizer granules were obtained.

This procedure was repeated three (3) more times, using the same amount of polyol and isocyanate co-reactants. The only exception being that the quantity of UL-28 tin catalyst was increased to 0.066 g. in the last two coatings to assure complete reaction. Theoretically, this would result in an 14.35% by weight polyurethane encapsulation, based on the total weight of the encapsulated fertilizer. However, the actual amount was about 12.1% by weight. This was due to the fact that polyurethane was also coated on the walls on the inside of the flask.

The polyurethane encapsulated fertilizer granules were tested for slow release properties in comparison with unmodified fertilizer granules using the following test procedure:

20 g. of fertilizer granules were combined with 80 g. of water and stored at room temperature in a closed jar for about 20 hours. After this time, the solids were filtered off and the amount of solids in the aqueous phase was determined after evaporation of water for 4 hours in a 100° C. oven.

In the case of this Example, the amount of fertilizer dissolved from the polyurethane encapsulated fertilizer was 1.90 g. of 10.8% by weight. By comparison, in the case of the unmodified fertilizer, the amount of dissolved fertilizer was determined to be 7.6 g. or 38% by weight. This means that only about 28% by weight of the water soluble fertilizer was released from the polyurethane encapsulated fertilizer granules in comparison with the unmodified sample, using identical water exposure conditions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing an encapsulated, slow release biodegradable fertilizer composition comprising:
   1) mixing a) an isocyanate-reactive component comprising one or more polyester polyols having a functionality of 1.5 to 4, and a molecular weight of from 500 to 5,000, and b) an organic aliphatic polyisocyanate component, to form a mixture wherein the ratio of the isocyanate groups of component b) to the isocyanate-reactive groups of component a) is from about 0.8:1 to about 2.0:1, and
   2) applying the mixture to fertilizer particles to form polyurethane encapsulated fertilizer particles as many times as necessary, so as to form encapsulated fertilizer particles which contain from about 0.5% to about 15% by weight of polyurethane, based on the total weight of the encapsulated fertilizer particles.

2. The process of claim 1, wherein said polyisocyanate is a diisocyanate.

3. The process of claim 2, wherein said diisocyanate is hexamethylene diisocyanate.

4. The process of claim 1, wherein said isocyanate-reactive component comprises a polyester polyol based on a diol which contains from 2 to 5 carbon atoms.

5. The process of claim 4, wherein said polyester polyol is linear.

6. The process of claim 1, wherein said polyester polyol is based on adipic acid, lactic acid, or valeric acid.

* * * * *